US009058469B2

(12) United States Patent
Rodriguez et al.

(10) Patent No.: US 9,058,469 B2
(45) Date of Patent: Jun. 16, 2015

(54) END USER LICENSE AGREEMENT DETECTION AND MONITORING

(75) Inventors: Adrian X. Rodriguez, Durham, NC (US); Carlos Santana, Durham, NC (US); Jared Thomas Siirila, Durham, NC (US); Rupal S. Soneji, Morrisville, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/352,805

(22) Filed: Jan. 18, 2012

(65) Prior Publication Data

US 2013/0185807 A1   Jul. 18, 2013

(51) Int. Cl.
  *G06F 21/10*    (2013.01)
(52) U.S. Cl.
  CPC .................................... *G06F 21/10* (2013.01)
(58) Field of Classification Search
  None
  See application file for complete search history.

(56) References Cited

U.S. PATENT DOCUMENTS

| 7,031,943 | B1 | 4/2006 | James | 705/59 |
| 7,603,370 | B2 | 10/2009 | Manasse | 707/101 |
| 7,734,550 | B1 | 6/2010 | Bennett et al. | 705/59 |
| 7,818,262 | B2 | 10/2010 | Kavuri et al. | 705/59 |
| 2002/0019814 | A1 | 2/2002 | Ganesan | 705/59 |
| 2003/0126033 | A1 | 7/2003 | Evans | 705/24 |
| 2006/0123465 | A1 | 6/2006 | Ziegler | 726/5 |
| 2007/0083474 | A1* | 4/2007 | Burkhart et al. | 705/59 |
| 2007/0233607 | A1* | 10/2007 | Burkhart et al. | 705/59 |
| 2007/0244826 | A1 | 10/2007 | Wang | 705/59 |
| 2010/0218182 | A1 | 8/2010 | Hahn | 705/59 |
| 2010/0241873 | A1* | 9/2010 | Miyazawa | 713/191 |
| 2011/0302574 | A1* | 12/2011 | Yoshikawa | 717/173 |

OTHER PUBLICATIONS

Microsoft Software License Terms, Microsoft, 2010, 11 pages.
"Configuring Intrusion Detection and Prevention Devices Guide," Release 2008.2, Juniper Networks, Inc., Jun. 2009, 154 pages.
"i5/OS V5R3 A Guide to Getting There from Previous OS/400 Releases," IBM Corporation, Sep. 2005, 40 pages.
"IEEE Standard Specifications for Public-Key Cryptography," IEEE Std 1363, Microprocessor Standards Committee of the IEEE Computer Society, Jan. 30, 2000, 236 pages.

* cited by examiner

*Primary Examiner* — Beemnet Dada
(74) *Attorney, Agent, or Firm* — VanLeeuwen & VanLeeuwen; Jeffrey S. LaBaw (57) ABSTRACT

An approach is provided for detecting and monitoring end user license agreement (EULA) compliance is provided. A request to access a executable software code is received from an end user. A EULA version corresponding to the requested executable software code is identified. A determination is made as to whether the end user has accepted the identified EULA. If the end user has not accepted the identified EULA, then an out of date EULA notification is sent to the end user, the EULA is sent to the end user requesting an acceptance to the EULA. A EULA response is received from the end user. If the end user accepts the EULA, then the end user is allowed access to the executable software code.

18 Claims, 8 Drawing Sheets

END USER LICENSE AGREEMENT DETECTION AND MONITORING

TECHNICAL FIELD

The present disclosure relates to an approach that detects and monitors an end-user's usage of software components with current license agreements that apply to the components. Furthermore, the present disclosure provides an approach that ensures agreement to the current license agreement from the end user.

BACKGROUND OF THE INVENTION

End user license agreements (EULA) are often lengthy and rather complex documents. When a user initially applies to use an online service, such as a social network site, media download site, etc., they are typically asked to review a EULA that applies to their usage of the site. As a contract of adhesion, there is typically no negotiation regarding the terms of the agreement. In order to use the service, the end user is forced to agree with the terms and conditions set forth by the provider. In addition, end users are usually informed that the terms and conditions contained in the EULA they originally reviewed can be changed at any time with little or no explicit notice to the end users. As contracts of adhesion, changes to EULAs are often deemed to have been accepted and agreed to by the end users simply by the end users continuing to use to service. In some sites, current users are asked to review modified EULAs but, similar to the initial EULA, the user is forced to agree to the modified terms and conditions before the user is allowed to use the service. Having companies and organizations change the terms and conditions without notifying the users can be costly. These costs can include having end users cease using the service, as well as costs related to litigation when end users sue the organization for privacy violations. Litigation risk is often high when the service and/or the EULA has been modified in a manner that arguably exposes or otherwise divulges the end users' personal or private data.

SUMMARY

An approach is provided for detecting and monitoring end user license agreement (EULA) compliance is provided. A request to access a executable software code is received from an end user. A EULA version corresponding to the requested executable software code is identified. A determination is made as to whether the end user has accepted the identified EULA. If the end user has not accepted the identified EULA, then an out of date EULA notification is sent to the end user, the EULA is sent to the end user requesting an acceptance to the EULA. A EULA response is received from the end user. If the end user accepts the EULA, then the end user is allowed access to the executable software code.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
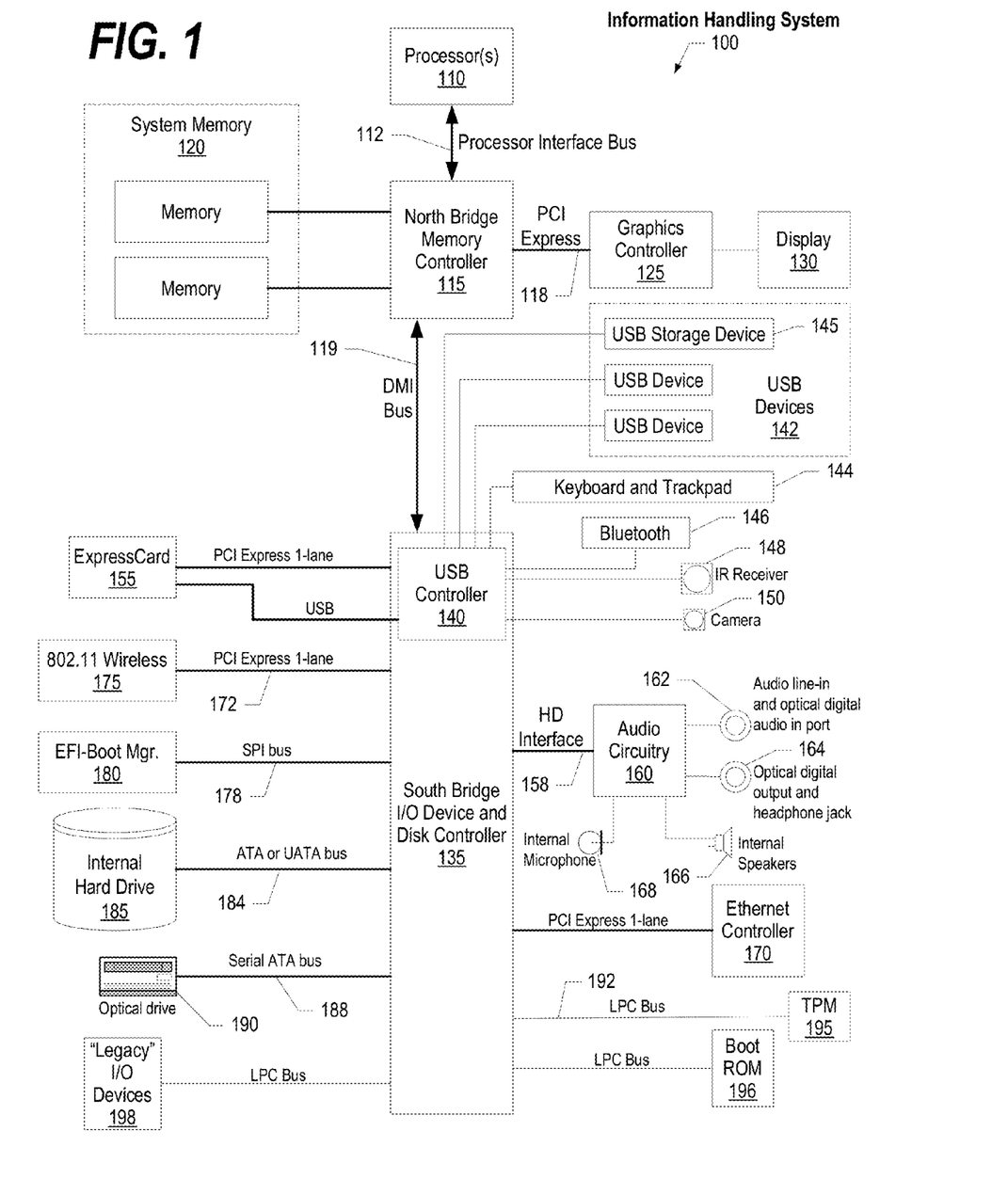
FIG. 1 is a block diagram of a data processing system in which the methods described herein can be implemented.
Figure 2:
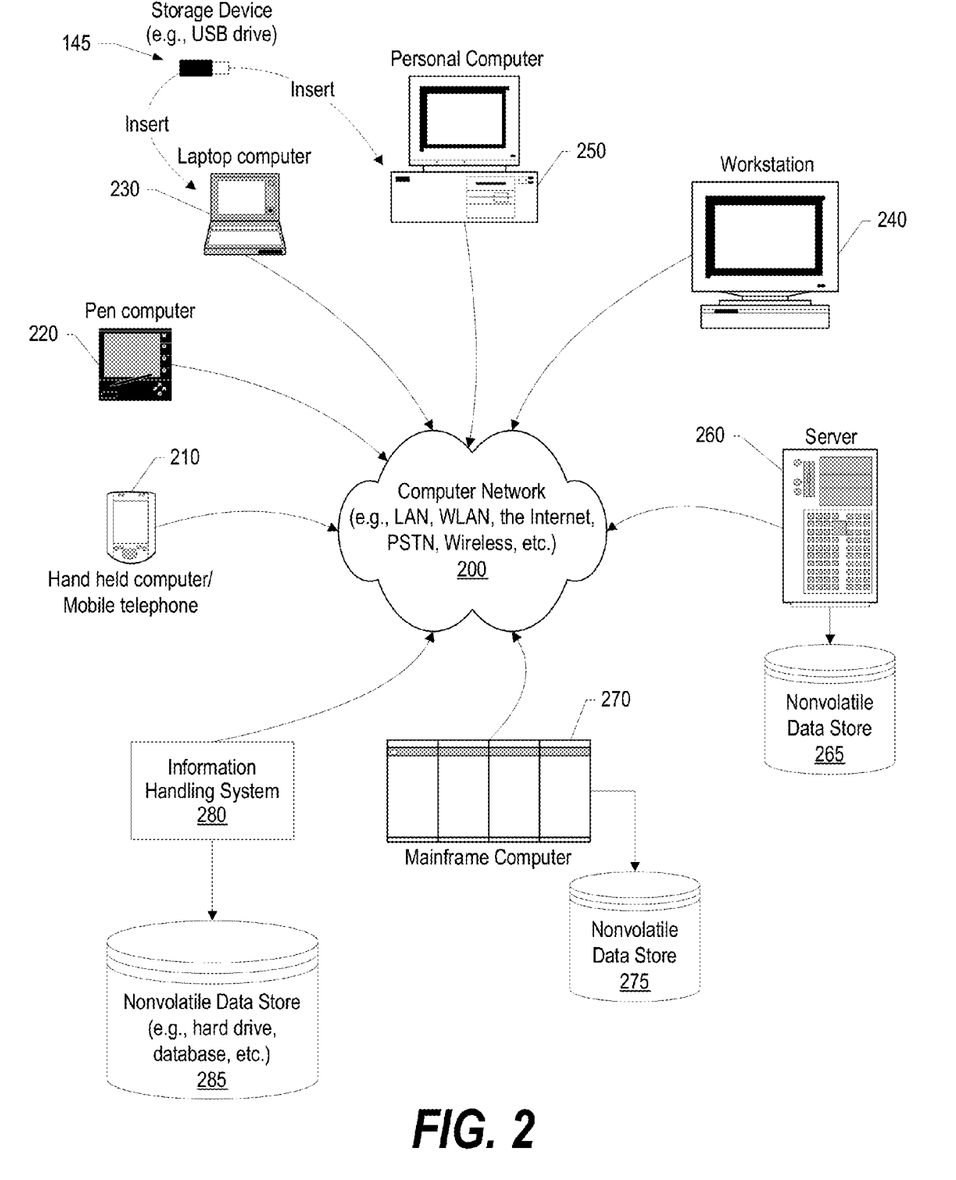
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
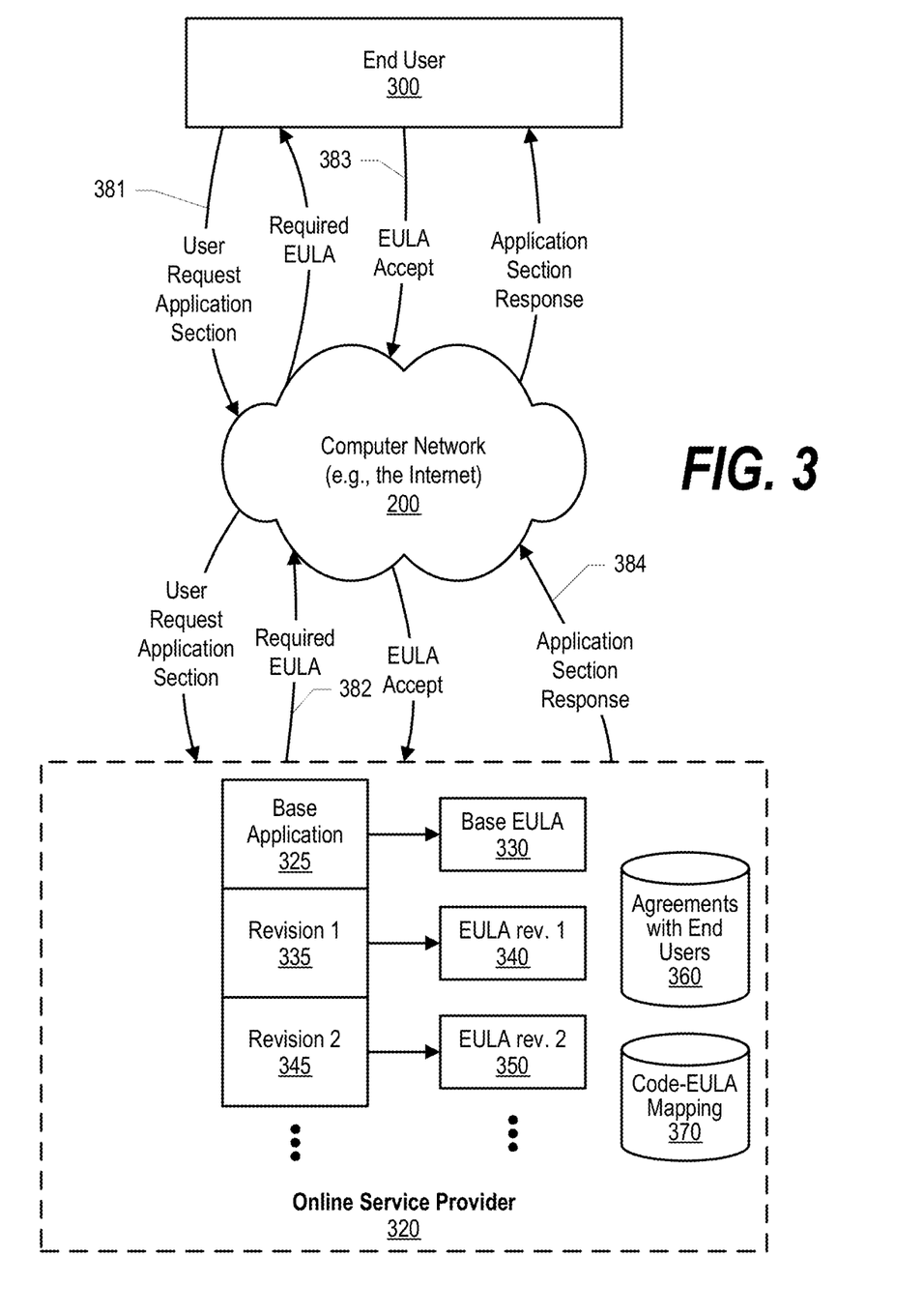
FIG. 3 is a network diagram depicting interactions between the end user and an online service with respect to the services End User License Agreement (EULA)

FIG. 3 is a network diagram depicting interactions between the end user and an online service with respect to the services End User License Agreement (EULA). As used herein, a EULA refers to any type of online agreement such as a "click-wrap" agreement as well as terms and conditions that are provided by other means, such as by a hyperlink accessible through a Web page, terms and conditions separately sent (e.g., using email, etc.) to a user, and the like. Further, EULA may apply to traditional end users as well as to other individuals, such as software developers, that may not traditionally be viewed as "end users." In some environments, more than one EULA may be used between the provider and the end user, such as in cases where content (e.g., digital music, photographs, etc.) are provided under one EULA, while executable code is provided under a different EULA. In these cases, multiple EULAs may be provided using the techniques provided herein.

In one embodiment, when end user 300 signs up for a service with online service provider 320 via computer network 200, such as the Internet, the end user will agree to the EULA. In an initial release, the end user might access the provider's initial Base Application 325 which is associated with Base EULA 330 to which the end user accepts in order to use the service provided by the base application. As new features are added by service provider 320 to the website or service, code changes will have to be made to facilitate the features as illustrated by code Revision 1 (335) and Revision 2 (345) which correspond to respective new versions of the EULA, in this case EULA rev. 1 (340) and EULA rev. 2, respectively, with these updated EULAs including new or different terms and conditions as compared to Base EULA 330.

After the new features have been added by the service provider and associated with the updated EULAs, at some point the end user attempts to use part of the service (code Revision 1 or 2) for which they have not accepted the terms and conditions. As the end user attempts to access the new code, an event is triggered that notifies the user that a new EULA is in effect for this portion of the service and they must accept the new EULA in order to access and execute the requested code.

The data flows connecting end user 300 and online service provider 320 in FIG. 3 depict an overall flow that handles code releases as well as updated EULA releases. At flow 381, end user 300 browses the site and requests use of the service or functionality provided by the service which is encoded in code releases 325, 335, and 345. Online service provider 320 keeps track of agreements (acceptances) that end users have submitted related to particular EULAs used by the site (e.g., EULAs 330, 340, 350, etc.). These records are maintained in agreements data store 360. Upon receiving the end user's request, the online service provider identifies the code being requested by the end user and then checks Code-EULA mapping data store 370. Code-EULA mapping data store depicts the current associations between the code that has been released by the service provider with the EULAs that applies to the various code releases.

If the online service provider determines that the end user has not accepted the EULA associated with the executable software code segment (e.g., base application 325, revision 1 (335), revision 2 (345), etc.), then the online service provider transmits an out of date EULA notification back to end user as depicted in data flow 382. In addition, the online service provider transmits a copy of the associated EULA back to the end user and requests that the end user accept the terms and conditions in the EULA before allowing the end user to proceed with accessing and executing the executable software code segment. The end user's acceptance to the proffered EULA is depicted by data flow 383. When the online service provider receives the end user's acceptance, agreements data store 360 is updated accordingly to indicate this end user's acceptance with a particular EULA (e.g., with EULA rev. 1 (340), etc.). In one embodiment, the same end user may have several entries in agreements data store pertaining to the different EULAs that have been accepted by the end user over time. Once agreement (acceptance) from the end user has been obtained for the requested executable software code, then online service provider 320 executes or otherwise provides the requested executable software code to the end user as depicted by data flow 384.

The detection that the user is requesting access to an executable software code segment to which the user has not accepted the associated license agreement can be accomplished in a variety of ways. In one embodiment, modified code can be determined at a broad level by new code file that corresponds to an EULA. In one embodiment, the executable software code segment can be examined similar to a debugging level (line by line) whenever the user runs code provided by the service provider. When the user is about to execute new code the action can either trigger that a new EULA associated to the new code should be presented to the user, which the user must accept before the new code is executed, or, the user can be prohibited from completing the task.

In some cases, changes to the basic service will require all users to re-accept the Base EULA. For example, if all current end users have agreed to Base EULA 330 and the Base EULA is changed (e.g., resulting in Base EULA version 2, etc.) then the current Base Application 325 will be disassociated from Base EULA 330 and instead associated with the updated EULA (e.g., Base EULA version 2) and this association is reflected in Code-EULA mapping data store 370. Subsequently, when end user 300 attempts to access Base Application 325 the online service provider will retrieve the end user's agreement data from agreements data store 360 as well as identifying the current EULA associated with the Base Application. After retrieving this data, the online service provider will determine that the end user has not yet accepted the EULA that now applies to the Base Application. Consequently, the end user will be notified of the out of data EULA and will be prompted to accept the terms and conditions included in the updated EULA that is now associated with the base application (e.g., Base EULA version 2). In another embodiment, the online service provider can choose to not have the user sign the updated EULA right away and, instead, send it to them by email, mail or other delivery system. Executable software code associated with a particular EULA can be done in various ways, such as based on time (e.g., executable software code released in the first quarter uses EULA rev. 1, while code released in the second quarter uses EULA rev. 2, etc.). In one embodiment, the EULA is based on release version (e.g., release versions 1.1.1 to 1.4.5 uses EULA rev. 1 while release versions 1.4.6 to 2.3.1 uses EULA rev. 2, etc.). This approach documents the end user consent with up to date EULAs before allowing the end user to continue using the service provided by the online service provider. In addition, this approach notifies and informs the end user of any EULA changes with terms and conditions applying to the end user's use of the service.

Figure 4:
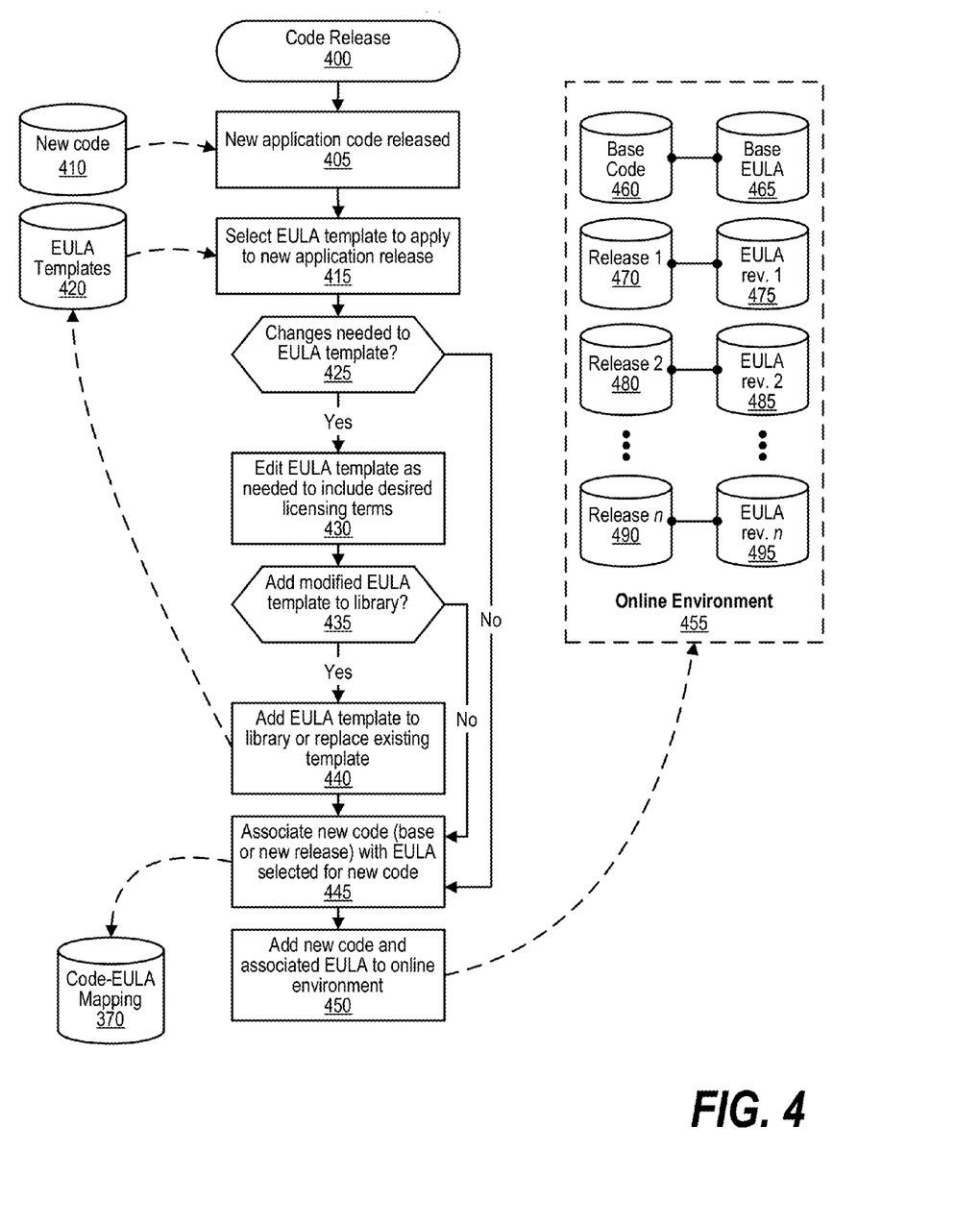
FIG. 4 is a flowchart showing steps performed by the service provider during a new or modified code release.

FIG. 4 is a flowchart showing steps performed by the service provider during a new or modified code release. Code release processing performed by a online service provider commences at 400 whereupon, at step 405, new executable software code, such as an executable software code segment, is released and retrieved from new code data store 410, such as from a software development team. At step 415, an EULA template that is to be used and applied to the new executable software code is selected from EULA templates data store 420. An example of a template might be the current EULA that is in place that may need to be modified based upon any variety of factors such as the executable software code being released, desired changes (additions, deletions, modifications, etc.) to the previous EULA, and the like.

A decision is made as to whether changes are desired to the selected EULA template (decision 425). If changes are desired, then decision 425 branches to the "yes" branch whereupon, at step 430, the selected EULA template is edited and the desired changes (additions, deletions, modifications, etc.) are made to the EULA template.

A decision is made as to whether the changed EULA template should be added to EULA template library data store 420 (decision 435). If the modified EULA template is being added the library, then decision 435 branches to the "yes" branch whereupon, at step 440, the modified EULA template is added to EULA template library data store 420 as either a new template or as a replacement to a template currently in the library. On the other hand, if the modified EULA template is not being added to the library, then decision 435 branches to the "no" branch bypassing step 440. Returning to decision 425, if the EULA template selected from EULA template library 420 does not need to be changed, then decision 425 branches to the "no" branch bypassing steps 430 through 440.

At step 445, the new executable software code is associated with the selected and potentially modified EULA. The association is stored in Code-EULA mapping data store 370. If the new executable software code is a replacement for a previous executable software code (e.g., the code has the same identifier, such as filename, etc., as a previous version of executable software code), then the code identifier is disassociated with the previous EULA and the code identifier is associated with the new EULA. At step 450, the new executable software code and its associated EULA are added to online environment 455 which includes code accessible by end users.

In the example shown, online environment 455 includes base executable software code 460 which is associated with EULA 465. In addition, the online environment includes various releases of executable software code (release 1 (470), release 2 (480) through release n (490)) and each of these releases is associated with an EULA (EULA rev. 1 (475), EULA rev. 2 (485) through EULA rev. n (495), respectively). The various releases may provide additional features or functionality on top of the base code release, may be updated versions of the base code release, or any combination thereof. In addition, while each code release is shown being associated with a different EULA, it is possible for multiple code releases to share a common EULA (e.g., base code and release 1 could be associated with a first EULA while release 2 could be associated with a second EULA, etc.).

Figure 5:
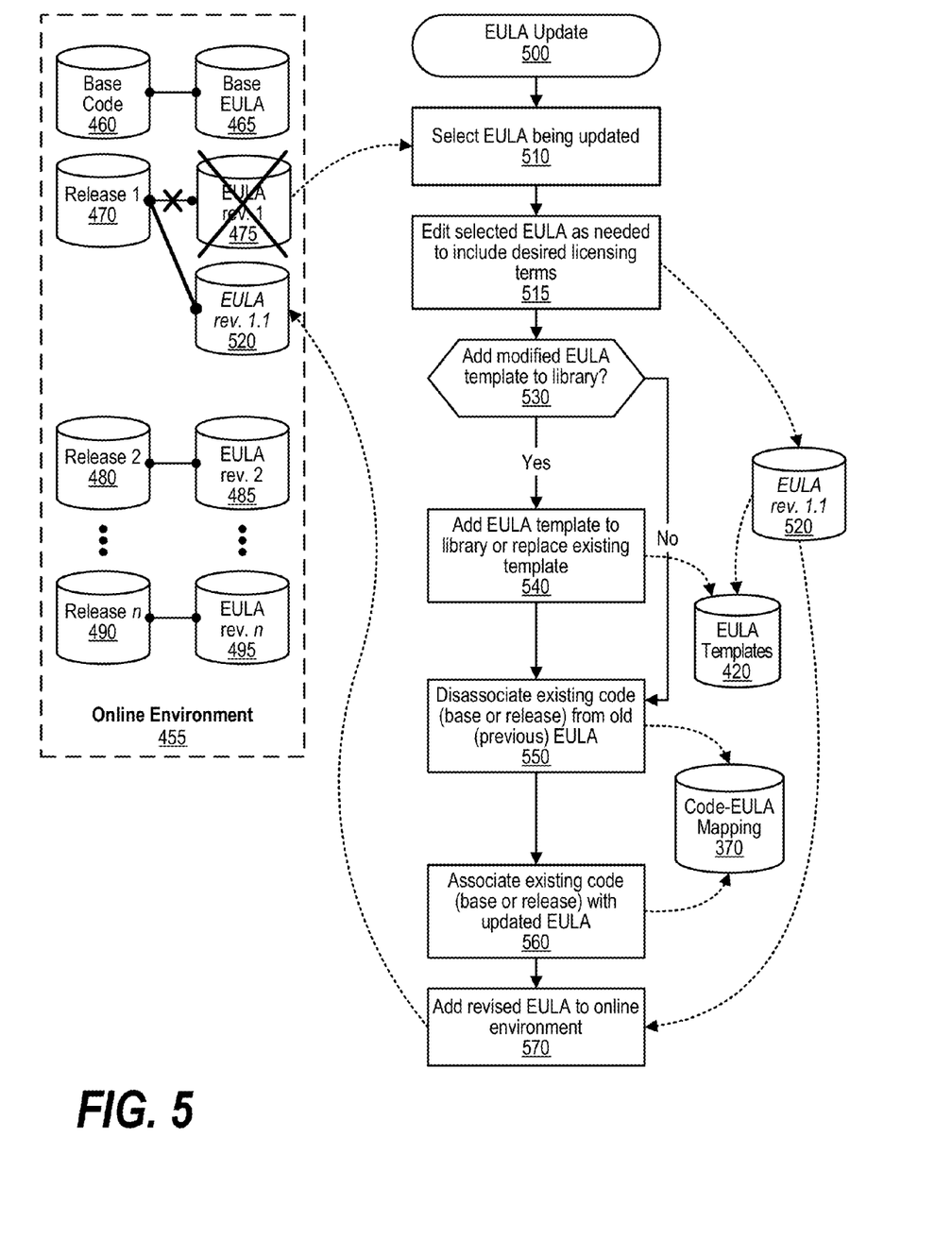
FIG. 5 is a flowchart showing steps performed by the service provider when updating an End User License Agreement (EULA)

FIG. 5 is a flowchart showing steps performed by the service provider when updating an End User License Agreement (EULA). In some cases it may be desirable for the online service provider to update an EULA even though the executable software code has not changed. In the example shown in FIG. 5, the EULA associated with code Release 1 (470) is being changed from EULA rev. 1(475) to EULA rev. 1.1 (520) as described below.

Online service provider processing of an EULA update commences at 500 whereupon, at step 510, the EULA that is being updated is selected from online environment 455. At step 515, the selected EULA is modified by adding, deleting, and modifying whatever licensing terms and conditions are being updated. In the example shown, the modification results in EULA rev 1.1. (520). The changes can be any level of changes from minor wording changes to large scale changes to the selected EULA.

A decision is made as to whether the modified EULA should be added to EULA template library data store 420 (decision 530). If the modified EULA template is being added the library, then decision 530 branches to the "yes" branch whereupon, at step 540, the modified EULA (e.g., EULA rev. 1.1 (520), etc.) is added to EULA template library data store 420 as either a new template or as a replacement to a template currently in the library. On the other hand, if the modified EULA template is not being added to the library, then decision 530 branches to the "no" branch bypassing step 540.

At step 550, the executable software code is disassociated from the old, or previous, version of the EULA. In the example shown, code Release 1 (470) was previously associated with EULA rev. 1 (475) so, in step 550, the previous association between code Release 1 (470) and EULA rev. 1(475) is deleted, or disassociated. This disassociation is reflected in an update to Code-EULA mapping data store 370.

At step 560, the executable software code is associated with the updated EULA. In the example shown, code Release 1 (470) is associated with updated EULA rev. 1.1 (520). The association is stored in Code-EULA mapping data store 370. At step 570, the EULA (e.g., EULA rev. 1.1 (520), etc.) is added to online environment 455 which includes the executable software code accessible by end users.

Figure 6:
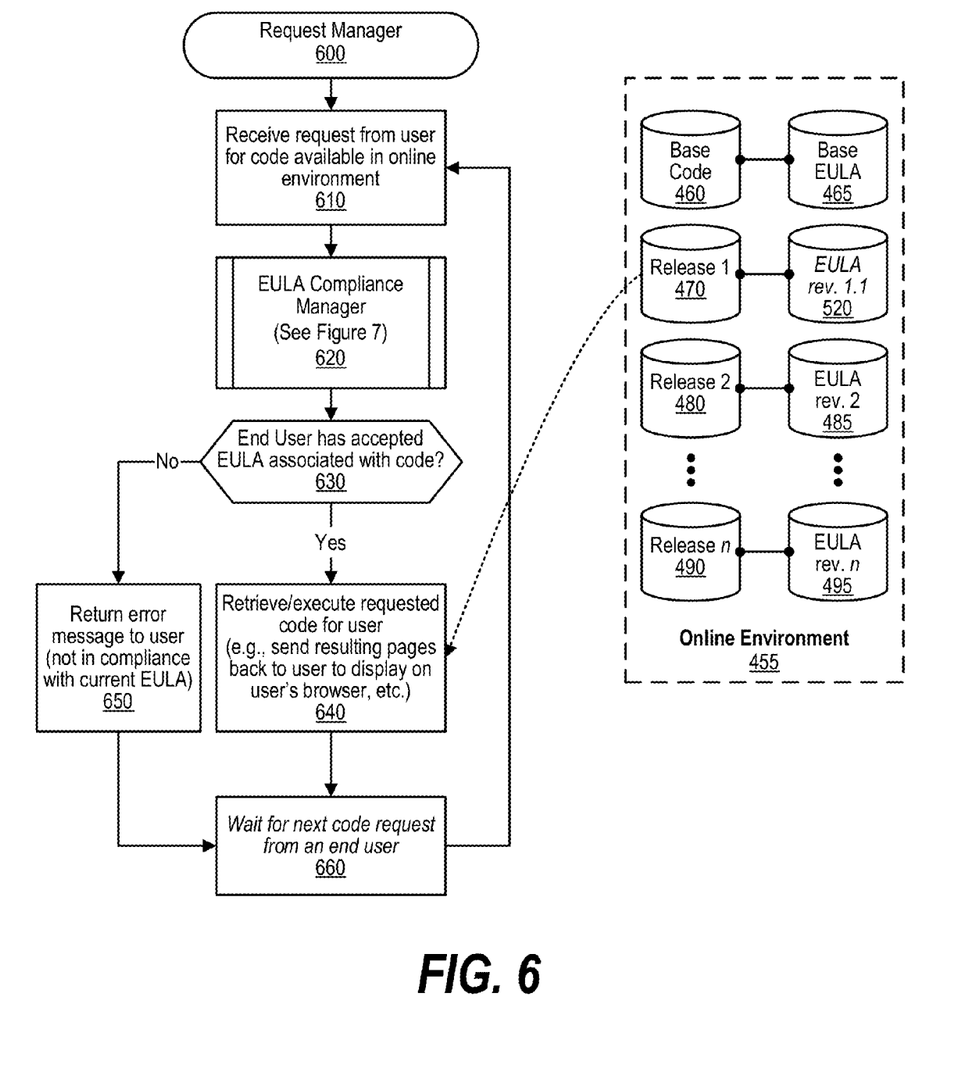
FIG. 6 is a flowchart showing steps performed by a request manager that handles an end user's requests to access and execute code maintained by the service provider.

FIG. 6 is a flowchart showing steps performed by a request manager that handles an end user's requests to access and execute code maintained by the service provider. Online service provider processing is shown commencing at 600 whereupon, at step 610, a request is received from an end user pertaining to executable software code available in the online service provider's online environment 455. At predefined process 620, the online service provider calls an EULA Compliance Manager to check for this end user's compliance (acceptance) with the EULA associated with the requested executable software code (see FIG. 7 and corresponding text for processing details).

The EULA Compliance Manager notifies the Request Manager (e.g., using a return code, etc.) as to whether this end user has accepted the EULA that is associated with the requested executable software code. A decision is made by the Request Manager as to whether the end user has accepted the terms and conditions included in the EULA that is associated with the requested executable software code (decision 630). If the end user has accepted the terms and conditions included in the associated EULA, then decision 630 branches to the "yes" branch whereupon, at step 640, the Request Manager allows the end user to access (e.g., retrieve, execute, etc.) the requested executable software code. In a client-server model, the access may be to send resulting data (e.g., Web pages, etc.) back to the user in order to display the data in the end user's browser software application. Returning to decision 630, if the end user has not accepted the terms and conditions included in the associated EULA, then decision 630 branches to the "no" branch whereupon, at step 650, an error is returned to the end user informing the end user that access to the executable software code is being denied because the end user has not accepted the terms and conditions in the current EULA.

At step 660, the request manager waits for the next executable software code request to arrive from an end user. When a request arrives, the Request Manager loops back to step 610 to receive and process the end user request as described above.

Figure 7:
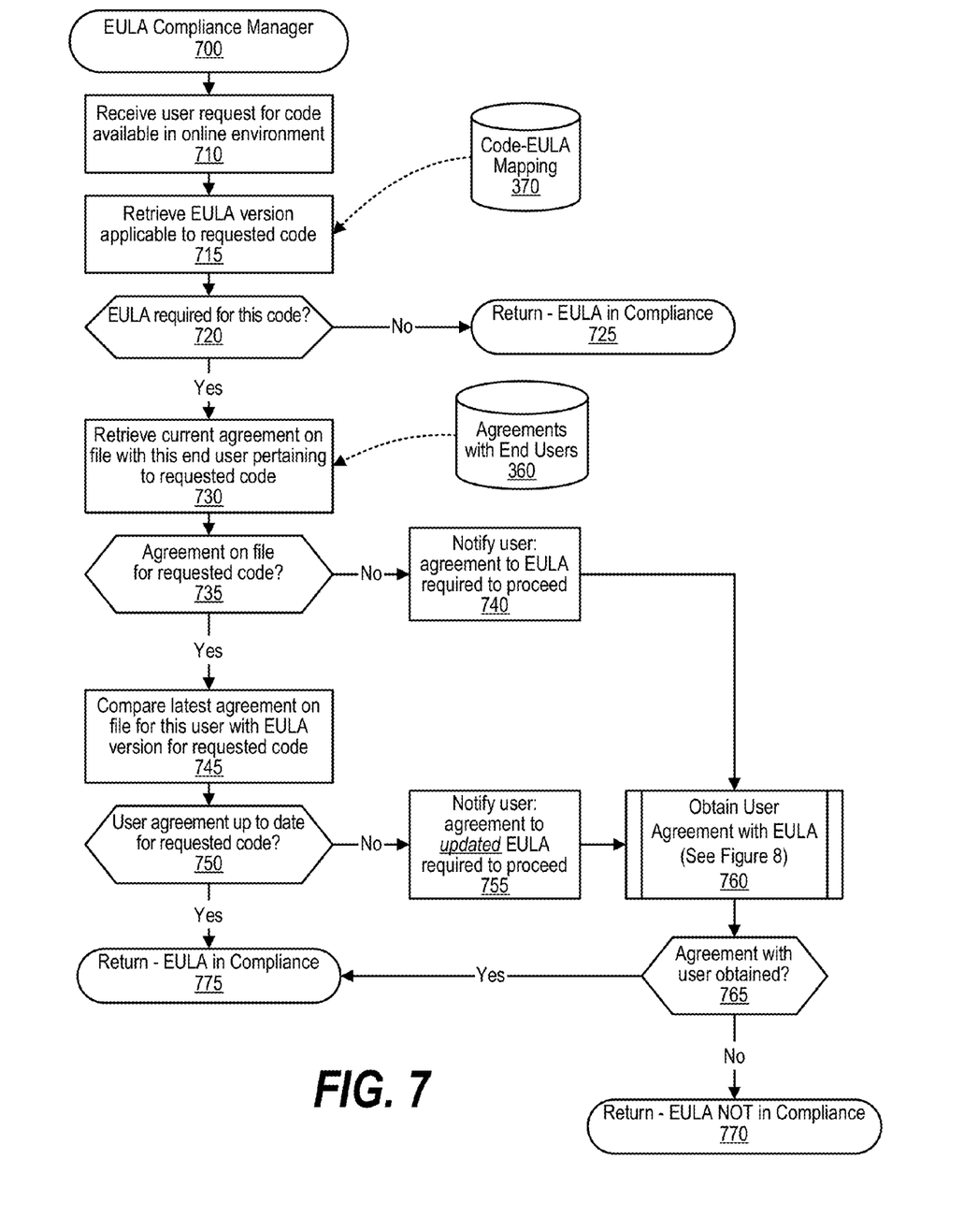
FIG. 7 is a flowchart showing steps performed by an EULA compliance manager that ensures end user agreements are received with applicable EULAs pertaining to code being requested by the end users.

FIG. 7 is a flowchart showing steps performed by an EULA compliance manager that ensures end user agreements are received with applicable EULAs pertaining to code being requested by the end users. The online service provider's EULA Compliance Manager process commences at 700 whereupon, at step 710, the Compliance Manager receives the end user request to access executable software code provided in the online service provider's online environment (the request being passed to the Compliance Manager by the Request Manager as shown in FIG. 6). Returning to FIG. 7, at step 715, the Compliance Manager retrieves the EULA version that is associated with the executable software code being requested by the end user. The EULA version is retrieved from Code-EULA mapping data store 370 that is used to keep track of the associations between the executable software code segments (e.g., files, releases, etc.) provided by the online service provider and the EULAs that apply to the various executable software code segments.

A decision is made as to whether an EULA is required to access the requested code (decision 720). Some code may be open-source, public domain, or some other type of code where an EULA is not applicable. In this case, decision 720 branches to the "no" branch whereupon, at 725, processing returns to the Request Manager and indicates (e.g., using a return code, etc.) that the end user is in compliance (has agreed) with any associated EULA (since there is no EULA with which acceptance is required). On the other hand, if an EULA is associated with the executable software code being requested by the end user, then decision 720 branches to the "yes" branch for further processing.

At step 730, the current level of agreements that have been accepted by this end user are retrieved from agreements data store 360. In one embodiment, the various accepted EULA versions are stored in agreements data store 360 that correspond to the end user (e.g., using a end user identifier, such as a username, email address, etc., pertaining to the end user, etc.). In this embodiment, if the end user has accepted a particular EULA then the acceptance applies to any executable software code that is associated with the EULA. In another embodiment, the executable software code and associated EULA are included in agreements data store 360 so that the end user must accept the EULA that applies to the executable software code regardless of whether the user already accepted this EULA but for a different executable software code release. The determination of which EULA acceptance model is being used is a decision of the online service provider based on the type of service being provided as well as usability and risk factors that pertain to the online service provider. A decision is made as to whether the end user has accepted any EULA that has been associated to the requested executable software code (decision 735).

If this end user has never accepted an EULA associated with the requested executable software code (e.g., first use of the site by the end user, new code released, etc.), then decision 735 branches to the "no" branch whereupon, at step 740 a notification is sent to the user that acceptance of the EULA is required in order to access the requested executable software code. At predefined process 760, the online service provider attempts to obtain the end user's acceptance with the EULA (see FIG. 8 and corresponding text for processing details). After execution of predefined process 760, a decision is made by the Compliance Manager as to whether the end user accepted the EULA (decision 765). If the end user did not accept the EULA, then decision 765 branches to the "no" branch whereupon, at 770, Compliance Manager processing returns to the Request Manager indicating (e.g., using a return code, etc.) that the end user is in not in compliance (has not agreed) with the applicable EULA. On the other hand, if the end user accepted the proffered EULA, then decision 765 branches to the "yes" branch whereupon, at 775, Compliance Manager processing returns to the Request Manager indicating (e.g., using a return code, etc.) that the end user is in compliance (has agreed) with the applicable EULA.

Returning to decision 735, if there is an agreement (acceptance) on file with the end user that pertains to the requested executable software code, then decision 735 branches to the "yes" branch. At step 745, the Compliance Manager compares the version of the EULA last accepted by the end user with the current version of the EULA that is currently associated with the executable software code. A decision is made as to whether the user has accepted the most up to date version of the EULA that is associated with the requested executable software code (decision 750). If the user has already accepted the current (up to date) version of the EULA that is associated with the requested executable software code, then decision 750 branches to the "yes" branch whereupon, at step 775, Compliance Manager processing returns to the Request Manager indicating (e.g., using a return code, etc.) that the end user is in compliance (has agreed) with the applicable EULA.

On the other hand, if the user has accepted a previous EULA that is now out of date, then decision 750 branches to the "no" branch whereupon, at step 755, a notification is sent to the end user that the user's acceptance to an updated EULA is required in order to proceed. At predefined process 760, the online service provider attempts to obtain the end user's acceptance with the EULA (see FIG. 8 and corresponding text for processing details). After execution of predefined process 760, a decision is made by the Compliance Manager as to whether the end user accepted the EULA (decision 765). If the end user did not accept the EULA, then decision 765 branches to the "no" branch whereupon, at 770, Compliance Manager processing returns to the Request Manager indicating (e.g., using a return code, etc.) that the end user is in not in compliance (has not agreed) with the applicable EULA. On the other hand, if the end user accepted the proffered EULA, then decision 765 branches to the "yes" branch whereupon, at 775, Compliance Manager processing returns to the Request Manager indicating (e.g., using a return code, etc.) that the end user is in compliance (has agreed) with the applicable EULA.

Figure 8:
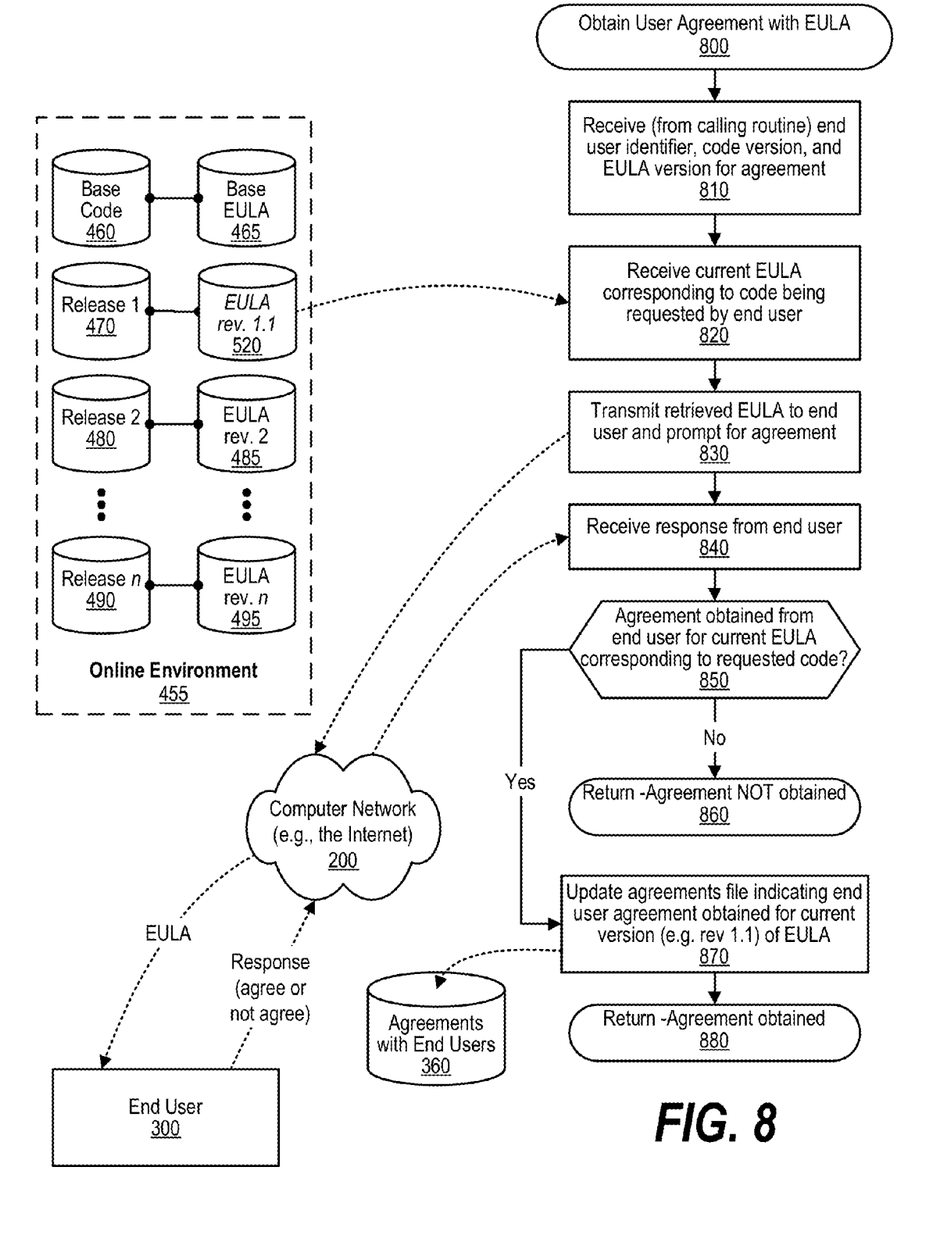
FIG. 8 is a flowchart showing steps performed by the service provider's EULA compliance manager to obtain end user agreement with the applicable EULAs.

FIG. 8 is a flowchart showing steps performed by the service provider's EULA compliance manager to obtain end user agreement with the applicable EULAs. Processing commences at 800 whereupon, at step 810, the routine receives (e.g., from the Compliance Manager) the end user identifier, the identification of the requested executable software code, and the EULA version for which an agreement (acceptance) is needed. At step 820, the current EULA that is associated with the requested executable software code is retrieved from online environment 455. At step 830, the retrieved EULA is transmitted to end user 300 via computer network 200 and the end user is prompted to read and accept the terms and conditions included in the EULA. At step 840, an EULA response is received from end user 300 with the EULA response indicating whether the end user has accepted or has rejected the terms and conditions included in the EULA.

A decision is made as to whether the end user has accepted the terms and conditions included in the EULA (decision 850). If the end user did not accept the terms and conditions included in the EULA, then decision 850 branches to the "no" branch whereupon, at 860, processing returns to the Compliance Manager indicating (e.g., using a return code, etc.) that an acceptance to the EULA was not obtained.

On the other hand, if the end user accepted the terms and conditions included in the EULA, then decision 850 branches to the "yes" branch whereupon, at step 870, agreements data store 360 is updated to indicate that this end user (e.g., the end user identifier) has agreed to this version of the EULA (e.g., EULA rev. 1.1 (530), etc.). In one embodiment, the executable software code associated with the accepted EULA is also recorded in agreements data store 360. Processing returns to the calling routine (see FIG. 7, the Compliance Manager) at 880 indicating (e.g., using a return code, etc.) that an acceptance to the EULA was obtained.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of detecting and monitoring end user license agreement (EULA) compliance, the method comprising:
receiving a first request to access a first executable software code, the first request received from an end user;
identifying a first EULA corresponding to the first executable software code;
determining, by one or more computer processors, whether the end user has accepted the first EULA;
in response to determining that the end user has accepted the first EULA, allowing the end user access to the first executable software code;
receiving a second request from the end user to access the first executable software code;
identifying an updated first EULA corresponding to the first executable software code;
transmitting an out of date EULA notification to the end user;
transmitting the updated first EULA to the end user;
requesting an acceptance from the end user to the updated first EULA;
receiving a EULA response from the end user; and
allowing the end user access to the first executable software code responsive to the EULA response being the end user's acceptance to the updated first EULA, wherein a first acceptance indicator is stored in a data store, the first acceptance indicator associated with the updated first EULA and with a user identifier that corresponds to the end user.

2. The method of claim 1 further comprising:
receiving a third request from the end user to access a second executable software code;
identifying a second EULA corresponding to second executable software code;
determining whether the end user has accepted the second EULA; and
in response to determining that the end user has not accepted the second EULA:
transmitting a second out of date EULA notification to the end user;
transmitting the second EULA to the end user;
requesting an acceptance from the end user to the second EULA;
receiving a second EULA response from the end user; and
allowing the end user access to the second executable software code responsive to the second EULA response being the end user's acceptance to the second EULA, wherein a second acceptance indicator is stored in the data store, the second acceptance indicator associated with the second EULA and with the user identifier that corresponds to the end user.

3. The method of claim 2 wherein the first executable software code and the second executable software code are both included in a common software package, wherein the first executable software code provides a first function and wherein the second executable software code provides a second function.

4. The method of claim 2 wherein the second executable software code is an updated version of the first executable software code.

5. The method of claim 2 further comprising:
prior to receiving the first request:
associating the first executable software code with the first EULA; and
associating the second executable software code with the second EULA; and
in response to receiving the first request:
identifying the first EULA based upon the association between the first executable
software code corresponding to the end user's first request and the first EULA; and
first searching the data store using the user identifier as a search criteria, the searching resulting in one or more first search results, wherein the determination of whether the end user has accepted the first EULA is based upon whether the first EULA is included in the search results; and
in response to receiving the third request:
identifying the second EULA based upon the association between the second executable software code corresponding to the end user's second request and the second EULA; and second searching the data store using the user identifier as a search criteria, the searching resulting in one or more second search results, wherein the determination of whether the end user has accepted the second EULA is based upon whether the second EULA is included in the second search results.

6. An information handling system comprising:
one or more processors;
a memory coupled to at least one of the processors;
a nonvolatile storage media accessible to at least one of the processors;
a network adapter that connects the information handling system to a computer network; and
a set of instructions stored in the memory and executed by at least one of the, wherein the set of instructions perform actions of:
  receiving a first request to access a first executable software code, the first request received from an end user;
  identifying a first EULA corresponding to the first executable software code;
  determining whether the end user has accepted the first EULA; and
  in response to determining that the end user has accepted the first EULA, allowing the end user access to the first executable software code;
  receiving a second request from the end user to access the first executable software code;
  identifying an updated first EULA corresponding to the first executable software code;
  transmitting an out of date EULA notification to the end user;
  transmitting the updated first EULA to the end user;
  requesting an acceptance from the end user to the updated first EULA;
  receiving a EULA response from the end user; and
  allowing the end user access to the first executable software code responsive to the EULA response being the end user's acceptance to the updated first EULA, wherein a first acceptance indicator is stored in a data store, the first acceptance indicator associated with the updated first EULA and with a user identifier that corresponds to the end user.

7. The information handling system of claim 6 wherein the set of instructions performs additional actions comprising:
  receiving a third request from the end user to access a second executable software code;
  identifying a second EULA corresponding to second executable software code;
  determining whether the end user has accepted the second EULA; and
  in response to determining that the end user has not accepted the second EULA:
    transmitting a second out of date EULA notification to the end user;
    transmitting the second EULA to the end user;
    requesting an acceptance from the end user to the second EULA;
    receiving a second EULA response from the end user; and
    allowing the end user access to the second executable software code responsive to the second EULA response being the end user's acceptance to the second EULA, wherein a second acceptance indicator is stored in the data store, the second acceptance indicator associated with the second EULA and with the user identifier that corresponds to the end user.

8. The information handling system of claim 7 wherein the first executable software code and the second executable software code are both included in a common software package, wherein the first executable software code provides a first function and wherein the second executable software code provides a second function.

9. The information handling system of claim 7 wherein the second executable software code is an updated version of the first executable software code.

10. The information handling system of claim 7 wherein the set of instructions performs additional actions comprising:
  prior to receiving the first request:
    associating the first executable software code with the first EULA; and
    associating the second executable software code with the second EULA; and in response to receiving the first request:
    identifying the first EULA based upon the association between the first executable
    software code corresponding to the end user's first request and the first EULA; and
    first searching the data store using the user identifier as a search criteria, the searching resulting in one or more first search results, wherein the determination of whether the end user has accepted the first EULA is based upon whether the first EULA is included in the search results; and
  in response to receiving the third request:
    identifying the second EULA based upon the association between the second executable software code corresponding to the end user's second request and the second EULA; and
    second searching the data store using the user identifier as a search criteria, the searching resulting in one or more second search results, wherein the determination of whether the end user has accepted the second EULA is based upon whether the second EULA is included in the second search results.

11. A computer program product stored in a non-transitory computer readable medium, comprising functional descriptive material that, when executed by an information handling system, causes the information handling system to perform actions that include:
  receiving a first request to access a first executable software code, the first request received from an end user;
  identifying a first EULA corresponding to the first executable software code;
  determining whether the end user has accepted the first EULA; and
  in response to determining that the end user has accepted the first EULA, allowing the end user access to the first executable software code;
  receiving a second request from the end user to access the first executable software code;
  identifying an updated first EULA corresponding to the first executable software code;
  transmitting an out of date EULA notification to the end user;
  transmitting the updated first EULA to the end user;
  requesting an acceptance from the end user to the updated first EULA;
  receiving a EULA response from the end user; and
  allowing the end user access to the first executable software code responsive to the EULA response being the end user's acceptance to the updated first EULA, wherein a first acceptance indicator is stored in a data store, the first acceptance indicator associated with the updated first EULA and with a user identifier that corresponds to the end user.

12. The computer program product of claim 11 wherein the actions further comprise:
receiving a third request from the end user to access a second executable software code;
identifying a second EULA corresponding to second executable software code;
determining whether the end user has accepted the second EULA; and
in response to determining that the end user has not accepted the second EULA:
transmitting a second out of date EULA notification to the end user;
transmitting the second EULA to the end user;
requesting an acceptance from the end user to the second EULA;
receiving a second EULA response from the end user; and
allowing the end user access to the second executable software code responsive to the second EULA response being the end user's acceptance to the second EULA, wherein a second acceptance indicator is stored in the data store, the second acceptance indicator associated with the second EULA and with the user identifier that corresponds to the end user.

13. The computer program product of claim 12 wherein the first executable software code and the second executable software code are both included in a common software package, wherein the first executable software code provides a first function and wherein the second executable software code provides a second function.

14. The computer program product of claim 12 wherein the second executable software code is an updated version of the first executable software code.

15. The computer program product of claim 12 wherein the actions further comprise:
prior to receiving the first request:
associating the first executable software code with the first EULA; and
associating the second executable software code with the second EULA; and
in response to receiving the third request:
identifying the first EULA based upon the association between the first executable software code corresponding to the end user's first request and the first EULA; and
first searching the data store using the user identifier as a search criteria, the searching resulting in one or more first search results, wherein the determination of whether the end user has accepted the first EULA is based upon whether the first EULA is included in the search results; and
in response to receiving the second request:
identifying the second EULA based upon the association between the second executable software code corresponding to the end user's second request and the second EULA; and
second searching the data store using the user identifier as a search criteria, the searching resulting in one or more second search results, wherein the determination of whether the end user has accepted the second EULA is based upon whether the second EULA is included in the second search results.

16. A method comprising:
establishing a network-based service application accessible by a plurality of end users over a computer network, wherein the network-based service application includes a plurality of executable software code segments;
creating a plurality of end user license agreements (EULAs);
associating each of the executable software code segments with one of the EULAs;
receiving a first request from a first of the plurality of end users, wherein the first end user corresponds to a first end user identifier, and wherein the first request is directed to a first of the executable software code segments;
determining whether the first end user has previously accepted a first EULA selected from the plurality of EULAs, wherein the first EULA is associated with the first of the executable software code segments;
in response to determining that the first end user has accepted the first EULA, allowing the first end user access to the first executable software code segment;
receiving a second request from the first end user, wherein the second request is directed to the first of the executable software code segments;
identifying an updated first EULA corresponding to the first executable software code segment;
transmitting an out of date EULA notification to the first end user;
transmitting the updated first EULA to the first end user;
requesting an acceptance from the first end user to the updated first EULA;
receiving a EULA response from the first end user; and
allowing the first end user access to the first executable software code segment responsive to the EULA response being the first end user's acceptance to the updated first EULA, wherein a first acceptance indicator is stored in a data store, the first acceptance indicator associated with the updated first EULA and with a user identifier that corresponds to the first end user.

17. The method of claim 16 further comprising:
searching a data store using the first end user identifier as a search criteria, wherein the data store includes a plurality of acceptance indicators with each of the acceptance indicators corresponding to one of the plurality of EULAs to which the first end user has previously accepted, wherein the searching results in one or more first search results, wherein the determination of whether the first end user has accepted the first EULA is based upon whether the acceptance indicator corresponding to the first EULA is included in the search results.

18. The method of claim 16 further comprising:
modifying the first EULA, the modifying resulting in the updated first EULA;
disassociating the first executable software code segment from the first EULA; and
associating the first executable software code segment with the updated first EULA.

* * * * *